US007890305B2

(12) United States Patent
Lionberg

(10) Patent No.: US 7,890,305 B2
(45) Date of Patent: Feb. 15, 2011

(54) METHOD FOR OPTIMIZING JOINT PRESS SET FOR USE WITH A PLURALITY OF BALL JOINTS

(75) Inventor: Daniel D. Lionberg, Milwaukee, WI (US)

(73) Assignee: Snap-on Incorporated, Kenosha, WI (US)

( * ) Notice: Subject to any disclaimer, the term of this patent is extended or adjusted under 35 U.S.C. 154(b) by 160 days.

(21) Appl. No.: 12/205,145

(22) Filed: Sep. 5, 2008

(65) Prior Publication Data

US 2009/0012753 A1 Jan. 8, 2009

Related U.S. Application Data

(60) Division of application No. 11/185,053, filed on Jul. 20, 2005, now Pat. No. 7,669,305, which is a continuation-in-part of application No. 10/950,066, filed on Sep. 24, 2004.

(51) Int. Cl.
*G06F 17/50* (2006.01)

(52) U.S. Cl. .......................................................... 703/1

(58) Field of Classification Search ..................... 703/1; 29/257

See application file for complete search history.

(56) References Cited

U.S. PATENT DOCUMENTS

| | | | | |
|---|---|---|---|---|
| 3,102,333 | A | 9/1963 | Thornton et al. | |
| 3,237,291 | A | 3/1966 | Kelso | |
| 3,651,553 | A | 3/1972 | Dodd | |
| 3,696,496 | A | 10/1972 | Corder | |
| 3,745,637 | A | 7/1973 | Rutherford et al. | |
| 3,786,544 | A | 1/1974 | Ferguson | |
| 3,791,006 | A | 2/1974 | Robinson | |
| 3,862,483 | A | 1/1975 | Kloster | |
| 3,942,234 | A | 3/1976 | Kepler | |
| 4,120,082 | A | 10/1978 | Bond | |
| 4,558,502 | A | 12/1985 | Gossmann et al. | |
| 4,570,319 | A | 2/1986 | Skoworodko | |
| 4,649,615 | A | 3/1987 | Hundley | |
| 4,658,488 | A | 4/1987 | Johnstead | |
| 4,977,660 | A | 12/1990 | Maynard | |
| 5,490,432 | A | 2/1996 | Allard et al. | |
| 5,781,977 | A | 7/1998 | Servones | |
| 5,836,078 | A | 11/1998 | Aiken et al. | |
| 5,857,252 | A | 1/1999 | Jansen | |
| 5,898,985 | A * | 5/1999 | Villarreal | 29/257 |
| 6,035,533 | A | 3/2000 | Warnke et al. | |
| 6,131,262 | A | 10/2000 | Freimann | |
| 2002/0107672 | A1 * | 8/2002 | Povich | 703/1 |

* cited by examiner

*Primary Examiner*—Jason Proctor
*Assistant Examiner*—Luke Osborne
(74) *Attorney, Agent, or Firm*—Seyfarth Shaw LLP

(57) ABSTRACT

A method and article for designing dual-mode adapters in a joint press kit. A plurality of ball joints for use with the adapters are selected. An adapter design is created by defining a first variable representative of a physical characteristic of the adapter design; defining a second variable representing a quantity of ball joints that are not compatible with the adapter design in a second operational mode; generating data sets including the first and second variables; and utilizing the data sets to determine a value for a characteristic of the adapter.

5 Claims, 8 Drawing Sheets

METHOD FOR OPTIMIZING JOINT PRESS SET FOR USE WITH A PLURALITY OF BALL JOINTS

CROSS-REFERENCE TO RELATED APPLICATIONS

This application is a division of U.S. application Ser. No. 11/185,053, filed Jul. 20, 2005, Pat. No. 7,669,305, which in turn is a continuation-in-part of application Ser. No. 10/950,066, currently pending, which was filed on Sep. 24, 2004.

BACKGROUND

People who service automobiles use joint press kits to install and remove joints, such as press-in ball joints and universal joints, of vehicle suspensions. A joint press kit often includes several adapters. The adapters typically fall into two categories. “Push” adapters bear against joints to drive them in a particular direction, e.g. into or out of a vehicle suspension, while “receiver” adapters bear against the vehicle suspension and receive a joint as it is pushed. Thus, the push adapter and the receive adapter cooperate to force the joint either into or out of a vehicle suspension.

Adapters are typically made to service a particular type of joint. The size and the shape of an adapter are tailored to the characteristics of the joint that it is meant to service. For example, a narrow ball joint requires a correspondingly narrow push adapter and can operate effectively with a wide number of receive adapters provided they are wider than the joint. There are many different sizes and shapes of ball joints. Accordingly, for a joint press kit to provide comprehensive coverage, it must include a correspondingly large number of adapters.

This presents a problem, however, because as the number of ball joint types increase, the cost of providing a larger number of adapters becomes prohibitive from a cost, time, and storage standpoint. Further, despite having a large number of adapters, the press kit might still not cover all the possible ball joints. Accordingly, what is needed is a joint press kit in which the number of adapters is optimized to provide the broadest possible coverage of the ball joints on the market.

A second difficulty with joint press kits is that they are not adaptable for use in a wide variety of vehicles. One make of vehicle may require installation of an upper ball joint by providing downward force, whereas another vehicle may require upward force. Therefore, what is needed is a joint press kit that may be used in many different configurations.

A third difficulty with joint press kits is they do not provide an accommodation for the grease fitting during the removal and installation of ball joints. The grease fitting is located on the side opposite the stem side of a ball joint. The grease fitting can not be present during installation and removal operations because it will interfere with the operation of the joint press. Thus, prior to removal of a ball joint, the grease fitting must be removed. Further, during installation of a ball joint, the grease fitting can only be added after the ball joint is securely placed in the suspension. These operations are often difficult to perform. Accordingly, there is a need for a joint press that allows a user to install or remove a ball joint while the grease fitting is in place.

A fourth difficulty with joint press kits is that the adapters do not always attach to the press easily or effectively. For example, if a kit requires that the adapters be screwed onto the pressure screw, this consumes valuable time. On the other hand, if the adapters can attach to the pressure screw quickly, they might not be effectively secured. Therefore, what is needed is a device for efficiently and effectively attaching ball joint adapters to the press.

A fifth problem with ball joint kits relates to the length of the adapters. Often, it may be desirable to use an adapter having a particular width to perform a removal or an installation operation. Yet, if the adapter is not long enough to bear against the vehicle suspension it is unusable. Therefore, what is needed is an adapter extension to impart usefulness to otherwise unusable adapters.

SUMMARY

In one embodiment, a joint press is provided. The joint press includes a yoke having a first end and a second end. A first adapter attachment member is positioned on the first end. A second adapter attachment member is positioned on the second end. The first adapter attachment member and the second adapter attachment member have the same profile, thereby allowing the same adapter to be removably connected to either the first end or the second end.

In another embodiment, a joint press is provided. The joint press includes a yoke having a first end and a second end. A first attachment member is located on the first end. A second attachment member is located on the second end. At least one adapter is provided that can be removably coupled to either the first attachment member or the second attachment member.

In a further embodiment, a joint press is provided. The joint press includes a yoke having a first end and a second end. A first adapter attachment member is positioned on the first end. A second adapter attachment member is positioned on the second end. Plural adapters are provided, each having a first end adapted to receive a joint and a second end that is adapted to be attached to either the first attachment member or the second attachment member.

In yet another embodiment, a device for attaching an adapter to a joint press is provided. The device includes a sleeve having an interior surface and an exterior surface, wherein the sleeve is part of the adapter. An interior groove is positioned on the interior surface of the sleeve. A snap-ring having a transverse circular cross-section is positioned in the interior groove. The snap-ring floats within the groove. A shaft having an exterior surface is part of the joint press. An exterior groove is positioned on the exterior surface of the shaft. The snap ring engages the exterior groove when the shaft and the sleeve are mated.

In a further embodiment, a pressure pad for a ball joint press is provided. The pressure pad includes a shaft and an engagement portion attached to the shaft. The engagement portion includes a recess that is adapted to receive a ball joint grease fitting.

In a further embodiment, a method for designing at least one dual-mode adapter for use with a ball joint press is provided. A plurality of ball joints for use with the ball joint press are selected and an adapter design is created. The adapter design is created by defining a first variable representative of a physical characteristic of the adapter design, generating a first data set that includes a value of the first variable, for each of the plurality of ball joints, that is sufficient to allow the adapter design to work with the respective ball joint in a first operational mode, defining a second variable representing a quantity of ball joints that are not compatible with the adapter design in a second operational mode, defining a plurality of predetermined values of the first variable, generating a second data set including a value of the second variable for each predetermined value of the first variable, utilizing the first data set to determine a design value for the first variable, comparing the design value to the second data set to determine whether or not to change the design value to increase the number of ball joints that will function with the adapter design in the second operational mode, and changing the adapter design value in response to an affirmative determination that a change in the in the design value will increase the number of ball joints that will function with the adapter design in the second operational mode. The dual-mode adapter is then manufactured according to the adapter design.

In a further embodiment, an article for designing at least one dual-mode adapter for use with a ball joint press that is compatible with a plurality of ball joints is provided. The article includes a computer-readable signal-bearing medium. Means in the medium defines a first variable representative of a physical characteristic of the adapter design. Means in the medium generates a first data set that includes a value of the first variable, for each of the plurality of ball joints, that is sufficient to allow the adapter design to work with the respective ball joint in a first operational mode. Means in the medium defines a second variable representing a quantity of ball joints that are not compatible with the adapter design in a second operational mode. Means in the medium defines a plurality of predetermined values of the first variable. Means in the medium generates a second data set including a value of the second variable for each predetermined value of the first variable. Means in the medium utilizes the first data set to determine a design value for the first variable. Means in the medium compares the design value to the second data set to determine whether or not to change the design value to increase the number of ball joints that will function with the adapter design in the second operational mode. Means in the medium changes the adapter design value in response to an affirmative determination that the design value should be changed to increase the number of ball joints that will function with the adapter design.

DETAILED DESCRIPTION

Figure 1:
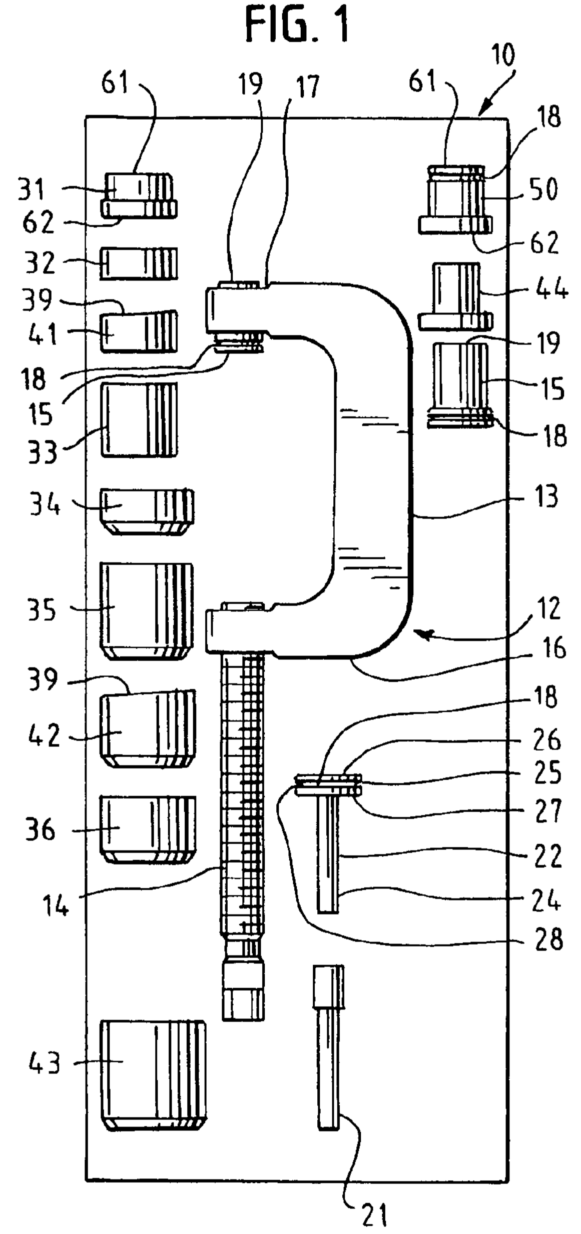
FIG. 1 is a side elevation view of joint press kit including a press, a plurality of pressure pads, and a plurality of adapters.

Referring to FIG. 1, a joint press kit 10 in one example comprises a press 12, a universal joint pressure pad 21, a ball joint pressure pad 22, a plurality of dual-use adapters 31, 32, 33, 34, 35, 36, a plurality of single-use adapters 41, 42, 43, 44, and an adapter extension 50. The components of the joint press kit 10 can be made of any material suitable for performing its intended function of installing and removing joints from vehicle suspensions. Exemplary materials include, but are not limited to alloy steels such as SAE 4140, SAE 8640, SAE 52100, and music wire.

Press 12, in one example, comprises a yoke 13, a pressure screw 14, and an adapter attachment shaft 15. Pressure screw 14 is positioned in a threaded opening (see FIG. 2) located at a first end 16 of yoke 13. Adapter attachment shaft 15 is positioned in an opening (see FIG. 2) located at a second end 17 of yoke 13.

Pressure screw 14 is at least partially hollow and includes an opening on one end. As will be discussed further herein, either of pressure pads 21, 22 (see FIG. 2) can be inserted into an opening located at an end of pressure screw 14. Pressure pads 21, 22 can then be utilized for installation and removal operations for universal joint bearing caps and ball joints, respectively.

Adapter attachment shaft 15 and pressure pad 22 act as adapter attachment members to which the various adapters can be connected to perform an installation or removal operation. Adapter attachment shaft 15 and pressure pad 22 both include an external circumferential groove 18. External groove 18 mates with a corresponding internal circumferential groove, containing a snap-ring, which is located within each adapter to attach the adapter to either shaft 15 or pressure pad 22. Alternatively, other means, such as friction fits or various threaded configurations, could be used to attach the adapters to attachment shaft 15 or pressure pad 22. The connection between these parts is discussed further herein.

Adapter attachment shaft 15, for exemplary purposes, is shown both positioned in the opening at end 17 of yoke 13 and to the side of yoke 13. Adapter attachment shaft 15 is connected to yoke 13 by placing end 19 into the opening on end 17 of yoke 13. Adapter attachment shaft 15 could be secured to yoke 13 through a variety of means. For example, shaft 15 could have an external groove that mates with an internal groove and snap-ring located in yoke 15. Alternatively, another means, such as a friction fit or threaded engagement could be used. Adapter attachment shaft 15 is at least partially hollow and in the illustrated embodiment is tubular to allow a ball joint stud to pass within it during a removal or installation operation.

Ball joint pressure pad 22 includes a shaft 24 and an engagement portion 25. The engagement portion 25 is cylindrical and includes a first base surface 26, a second base surface 27, and a sidewall 28. External groove 18 is located on the sidewall 28 of engagement portion 25. Base surface 26 in one example is flat and can be utilized to engage a ball joint. Base surface 27 is connected to shaft 22.

The dual-use adapters 31-36 are designed to function as both "push" adapters and "receive" adapters. Single-use adapters 41-44 are designed to perform only one function, either pushing or receiving. Each of the adapters has a first end 61 for engaging a joint, either through pushing or receiving, and a second end 62 that connects to adapter attachment shaft 15 or to pressure pad 22. Adapters 31-36 and adapters 43, 44 are basic cylindrical adapters. Adapters 41, 42 include have an angled surface 39 at end 61 for engaging an angled suspension member.

Adapter extension 50, as will be discussed herein, is stackable with respect to the other adapters. Thus, adapter extension 50 can increase the effective length of the other adapters. Adapter extension 50 includes external groove 18 for mating with the snap ring the other adapters.

In another example, a common grease fitting that installs by way of threaded interface, is installed in a radially drilled hole in the yoke 13 generally at the end 16 that includes the internally threaded opening in which the pressure screw 14 is positioned. The threaded bore in which the grease fitting mounts begins at a location on the yoke 13 such that when the grease fitting is installed it is not prone to being damaged by contact with external objects during use. This bore continues through the solid forging of the yoke 13, breaking into the larger, internally threaded pressure screw bore mentioned above.

Figure 2:
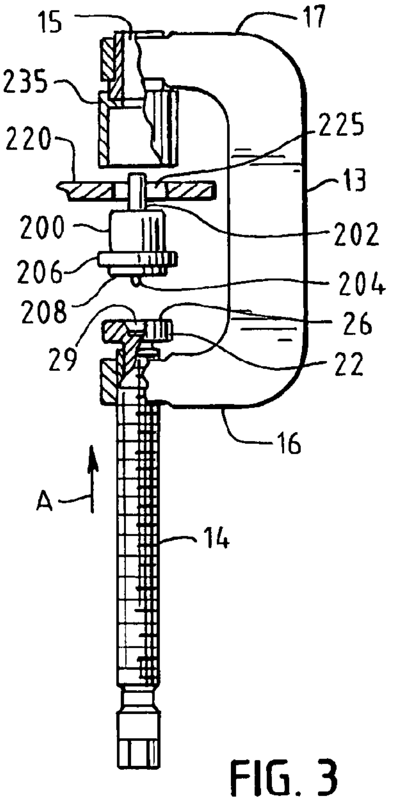
FIG. 2 is a side elevation view of the joint press kit of FIG. 1 shown partially cut away and in an exemplary configuration operable to insert a ball joint into a suspension.
Figure 3:
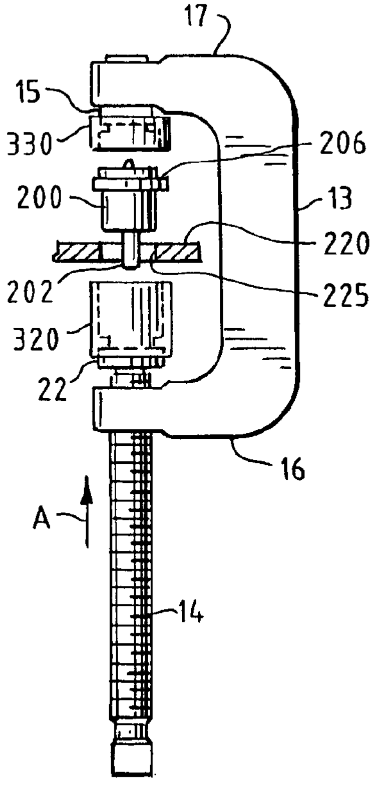
FIG. 3 is a side elevation view of the joint press kit of FIG. 1 shown in another exemplary configuration for installing a ball joint into a suspension.
Figure 4:
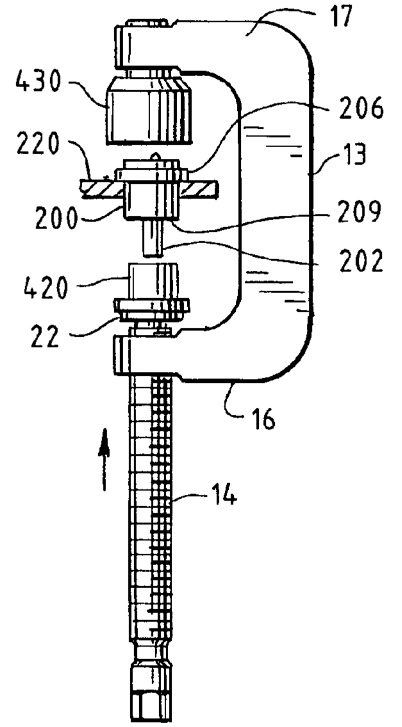
FIG. 4 is side elevation view of the joint press of FIG. 1 shown in an exemplary configuration for removing a ball joint.

Referring to FIGS. 2-4, a typical ball joint 200 includes a stem 202, a grease fitting 204, a flange 206, and a surface 208 against which pressure pad 22 can push. The ball joint 200 is typically installed into an opening in a portion of an automobile suspension (e.g. control arm, axle, knuckle, etc.). FIGS. 2-4 depict this portion of the automobile suspension as item 220 and the opening as 225.

Ball joints typically install either in the direction of the stem 202 or in a direction opposite the stem 202. FIGS. 2-4 depict a ball joint 200 that is installed in the stemwise direction and removed in the counterstemwise direction.

For brevity, the drawing depicts press kit 10 in operations with a ball joint that installs in the stemwise direction. As those with skill in the art would understand, joint press kit 10 will also function with ball joints that install in the counterstemwise direction.

Referring now to FIG. 2, in one example, the joint press kit 10 is configured to install ball joint 200 into the suspension 220, by positioning the pressure screw 14 and ball joint pressure pad 22 on the side of ball joint 200 that grease fitting 204 is located on. In the operation depicted in FIG. 2, pressure pad 22 is used to push ball joint 220. If necessary, an adapter could be placed on pressure pad 22.

Figure 6:
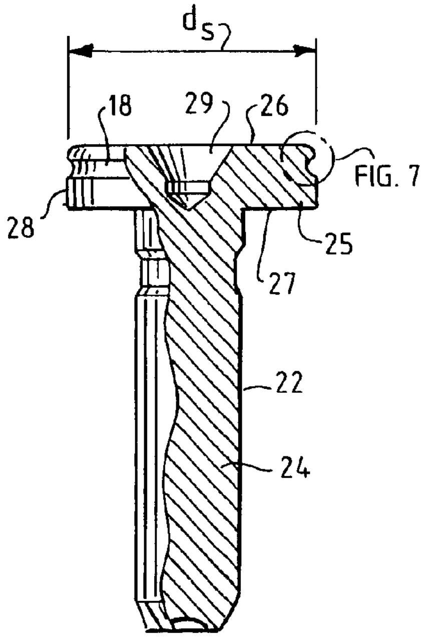
FIG. 6 is an enlarged cut away view of the ball joint pressure pad shown in the joint press kit of FIG. 1.

Referring to FIGS. 2 and 6, pressure pad 22 includes a recess 29 located on surface 26. Recess 29 is shaped and dimensioned to receive grease fitting 204. Accordingly, pressure pad 22 can be brought to bear against surface 208 of ball joint 200 while the grease fitting 204 is in place.

Referring now to FIG. 2, to install the ball joint, pressure pad 22 is brought to bear against surface 208 of ball joint 200. On the opposite end 17 of yoke, an adapter 235 is positioned on attachment shaft 15. Adapter 235 can be any adapter capable of acting as a receiver. Table 1 provides a list of the adapters shown in FIG. 1 and identifies each as a receiver, a pusher, or dual-use. It should be noted that all of the adapters in Table 1 are adapted to fit on both receive shaft 15 and pressure pad 22.

TABLE 1

| Number | Function |
|---|---|
| 31 | Dual |
| 32 | Dual |
| 33 | Dual |
| 34 | Dual |
| 35 | Dual |
| 36 | Dual |
| 41 | Receiving |
| 42 | Receiving |
| 43 | Receiving |
| 44 | Pushing |
| 50 | Extension |

Whether an adapter is placed on pressure pad 22 depends on the geometry of the ball joint 200 and the configuration of the vehicle suspension. Similarly, the choice of adapter to place on attachment shaft 15 depends on the geometry of ball joint 200 and the configuration of the vehicle suspension. The particular mechanic performing the operation will decide after analyzing both the ball joint 200 and the suspension.

To install ball joint 200, pressure screw 14 is turned so that pressure pad 22 advances in direction A. Surface 26 of pressure pad 22 will eventually contact surface 208 of ball joint 200 and adapter 235 will bear against suspension 222. As the pressure screw 14 continues to be turned, adapter 235 will provide an opposing force against which pressure pad 22 pushes to drive ball joint 200 into opening 225. Stem 202 of ball joint will enter the bore of adapter 235. Accordingly, as will be discussed further herein the through bore of adapter 235 must be large enough to accommodate the ball joint stem 202. Ball joint 200 will stop advancing when flange 206 contacts suspension 220.

Referring to FIG. 3, an insertion operation is shown in which the orientation of yoke 13 relative to the ball joint 200 is reversed as compared to FIG. 2. This might be necessary for certain vehicles. For instance, if there is no room to apply a wrench to the end of pressure screw 14 using the configuration of FIG. 2, then the configuration of FIG. 3 might be desirable.

In FIG. 3, pressure pad 22 has a receiver 320 attached and attachment shaft 15 has a push adapter 330 attached. Once again pressure screw 14 is turned to advance adapter 320 toward suspension 220. At a certain point, adapter 320 will bear against suspension 220 while adapter 330 bears against flange 206 of ball joint 200. As pressure screw 14 turns, stein 202 of ball joint 200 will enter the bore of adapter 320 and adapters 320, 330 will squeeze ball joint 200 into opening 225.

FIG. 4 depicts a removal operation. Ball joint 200 is shown attached to suspension 220. An adapter 420 is attached to pressure pad 22 and an adapter 430 is attached to attachment shaft 15. Once again adapters 420, 430 are chosen according to the geometry of ball joint 200 and suspension 220. Adapter 420 acts as a push adapter and adapter 430 acts as a receive adapter. As pressure screw 14 turns, stein 202 enters the bore of adapter 420, and adapter 420 eventually bears against surface 209 of ball joint 200. Meanwhile, adapter 430 surrounds flange 206 of ball joint 200 and bears against suspension 220. As pressure screw 14 continues to turn, adapter 430 pushing against suspension 220 provides push adapter 420 with an opposing force against which it pushes to expel ball joint 200 from suspension 220.

Figure 5:
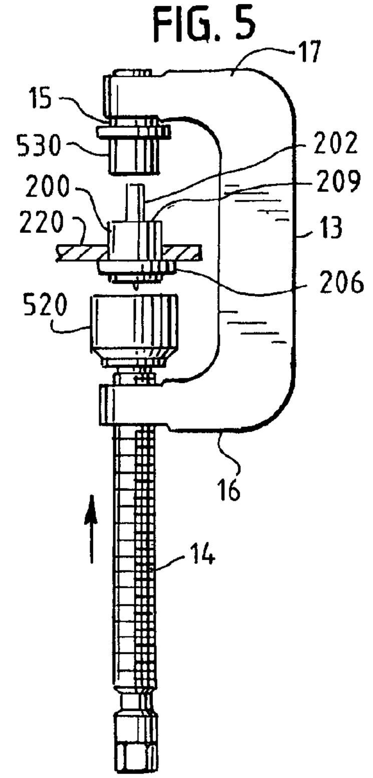
FIG. 5 is a side elevation view of the joint press of FIG. 1 shown in a second exemplary configuration for removing a ball joint.

Referring to FIG. 5, a removal operation is shown in which the orientation of yoke 13 relative to ball joint 200 is reversed. Receive adapter 520 is positioned on pressure pad 22 and push adapter 530 is positioned on attachment shaft 15. As pressure screw 14 advances adapter 520, adapter 520 surrounds flange 206 of ball joint 200 and bears against suspension 220. Meanwhile, stem 202 enters the bore of push adapter 530, which then bears against surface 209 of ball joint 200. As pressure screw 14 turns, adapter 530 pushes ball joint 200 out of suspension 220.

Referring to FIGS. 1 and 6, as was stated earlier, pressure pad 22 comprises shaft 24 and engagement portion 25. Engagement portion 25 is cylindrical and includes first base surface 26, second base surface 27, and sidewall 28. Circumferential groove 18 is positioned on sidewall 28. In addition, engagement portion 25 has outer diameter ds. In one example, end 19 of attachment shaft 15 and end 61 of adapter extension 50 include the identical profile as engagement portion 25. In other words, end 19 of attachment shaft 15 and end 61 of extension 50 are cylindrical, have the same outer diameter ds, and include circumferential groove 18 positioned on the sidewall of their cylindrical surfaces; thus, providing attachment shaft 15, pressure pad 22, and extension 50 with an identical interface for mating with the adapters. In one example ds is 1.645 inches.

Figure 8:
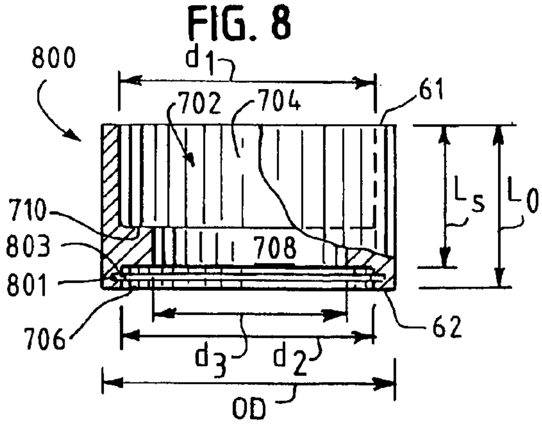
FIG. 8 is an enlarged cut away view of an exemplary joint adapter of the kit of FIG. 1.

Referring to FIG. 8, an exemplary adapter 800 is shown for illustrative purposes to describe certain features that are common to all of the adapters of FIG. 1. The characteristics of adapter 800 depend on the particular adapter of FIG. 1 that adapter 800 represents. Each adapter includes a first end 61 and second end 62. First end 61 either pushes against a ball joint or receives a ball joint. End 62 is the end that is connected to adapter attachment shaft 15, pressure pad 22, or adapter extension 50. Each adapter includes a bore 702 which runs from first end 611 to second end 62. Bore 702 includes three portions. The first portion 704 is adapted to receive or engage a ball joint. The second portion 706 is adapted to receive end 19 of attachment shaft 15, engagement portion 25 of pressure pad, and end 61 of adapter 50. Portion 708 is a through portion that communicates with portions 704 and 706. The intersection of portion 706 and portion 708 provides a ledge or ridge 710 against which adapter receive shaft 15, pressure pad 22, or extension 50 push when press kit 10 is in use.

As will be further discussed herein, second portion 706 of each adapter includes a groove 801 in which a snap ring 803 is positioned. When pressure pad attachment shaft 15, pressure pad engagement portion 25, or end 61 of extension 50 are inserted into portion 706, groove 18 mates with groove 801 and snap ring 803 engages both grooves 18, 801, thereby holding the pieces together.

First portion 704 has a diameter $d_1$. Diameter $d_1$, varies according to the particular adapter. The values of d1 are chosen so kit 10 will cover the largest number of ball joints possible. The diameter $d_1$ for each adapter shown in FIG. 1 is provided in Tables 2 and 3.

TABLE 2

Cylindrical Adapters

| ADAPTER | d1 | OD | bore depth | d3 | Ls | Lo |
|---|---|---|---|---|---|---|
| 31 | 1.680 | 1.890 | 0.650 | 1.250 | 0.830 | 1.100 |
| 32 | 1.775 | 2.000 | 0.550 | 1.250 | 0.730 | 1.000 |
| 33 | 2.010 | 2.250 | 1.700 | 1.250 | 1.880 | 2.150 |
| 34 | 2.250 | 2.500 | 0.670 | 1.250 | 0.850 | 1.120 |
| 35 | 2.250 | 2.500 | 2.300 | 1.250 | 2.480 | 2.750 |
| 36 | 2.425 | 2.750 | 1.250 | 1.250 | 1.430 | 1.700 |
| 43 | 2.680 | 2.937 | 2.300 | 1.250 | 2.480 | 2.750 |

TABLE 2-continued

Cylindrical Adapters

| ADAPTER | d1 | OD | bore depth | d3 | Ls | Lo |
|---|---|---|---|---|---|---|
| 44 | 0.895 | 1.330 | 1.550 | 0.895 | 1.400 | 1.820 |
| 50 | 1.250 | 1.645 | 1.780 | 1.250 | 1.650 | 2.050 |

TABLE 3

Special Shaped Adapters

| ADAPTER | d1 | OD | MAX. bore depth | d3 | Face angle | Ls | cutout or angle? | Lo |
|---|---|---|---|---|---|---|---|---|
| 41 | 1.845 | 2.000 | 0.800 | 1.250 | 4.500 | 0.980 | Angle | 1.250 |
| 42 | 2.350 | 2.650 | 1.700 | 1.250 | 4.500 | 1.880 | Angle | 2.150 |

Second portion 706 has a diameter $d_2$. Diameter $d_2$ does not vary for the respective adapters. In one example, $d_2$ is 1.656 inches for each adapter. Third portion 708 has a diameter $d_3$ that also does not vary from adapter to adapter. In one example, diameter $d_3$ is 1.25 inches, which is large enough to allow passage of the largest known ball joint stud 202 (FIGS. 2-5) to pass through the adapter. FIG. 8 also illustrates an outer diameter (OD) of adapter 800, an overall length (Lo) of adapter 800, and a stack length (Ls) of adapter. Exemplary values of these lengths for each adapter of FIG. 1 are provided in tables 2 and 3.

Figure 9:
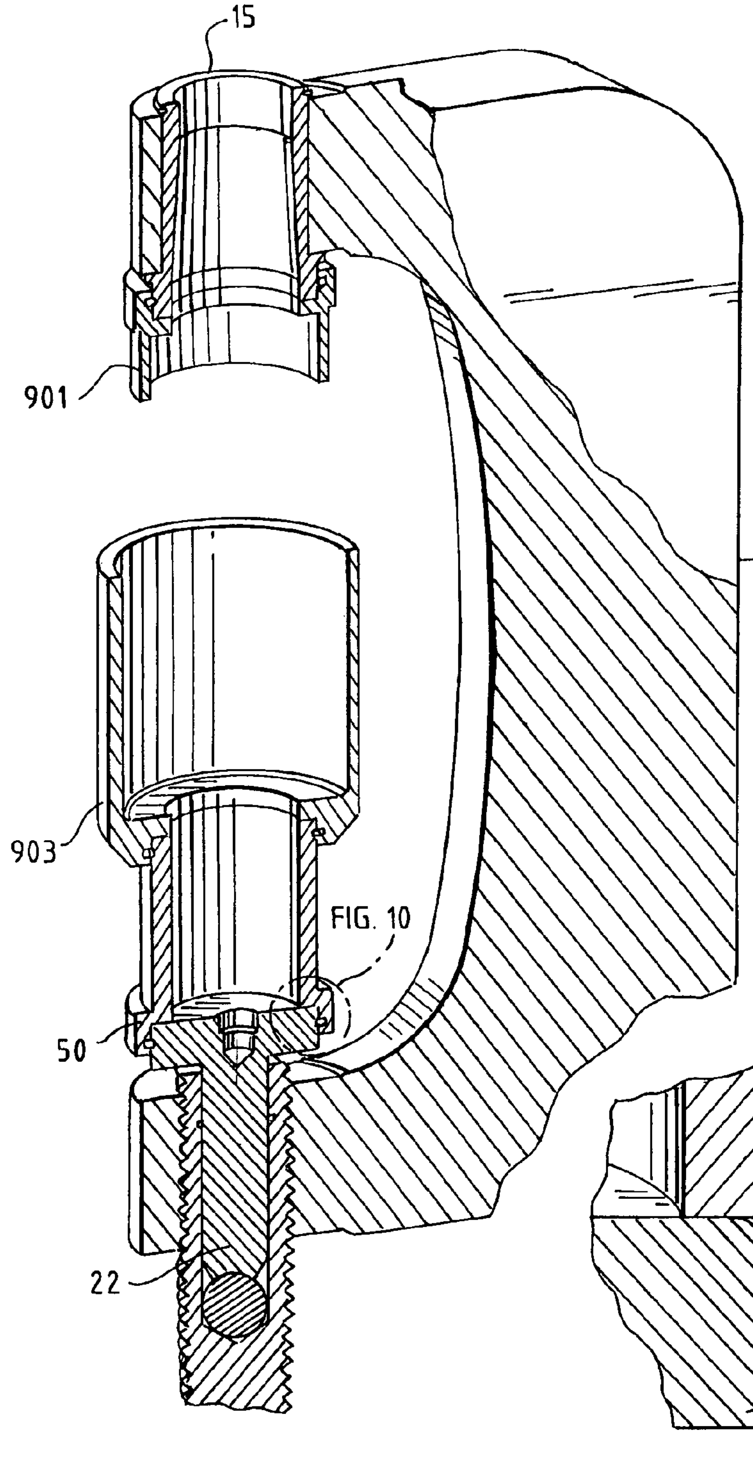
FIG. 9 is an enlarged, fragmentary, perspective view of the joint press kit of FIG. 1 shown in an exemplary configuration utilizing the adapter extension, with portions of the yoke, pressure screw, pressure pad, and adapters cut away.
Figure 10:
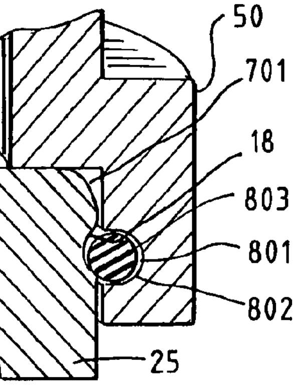
FIG. 10 is a further enlarged fragmentary view of the encircled portion of FIG. 9.

FIGS. 9-10 depict an exemplary configuration in which an adapter 901 is connected to attachment shaft 15, an adapter 903 is connected to extension 50, and extension 50 is connected to pressure pad 20 utilizing grooves 18, 801 and snap-ring 803. Referring to FIG. 10, it can be seen that the mechanism functions because snap-ring 803 is allowed to "float" within groove 803 when the pieces are not connected. By "float" it is meant that snap-ring 803 does not contact the bottom 802 of groove 801 when the piece is disconnected. Further, groove 801 has sufficient width to allow snap ring to 803 to move within groove 801. Accordingly, when shaft 15, pressure pad 22, or extension 50 are inserted into the receiving portion of the adapter, tapered portion 701 of the shaft 15 (see FIG. 7), pressure pad 22, or extension 50 abuts snap ring 803 and causes it to expand into groove 801. Eventually, as the pieces are brought closer together, snap-ring 803 will reside in both groove 18 and groove 801, thereby causing the pieces to mate. It is important that groove 801 is large enough for snap-ring 803 to float, but not large enough that snap-ring becomes off-center within the adapter. Exemplary dimensions of adapter features discussed herein are as follows: Groove 801 features a major inner diameter of 1.821", and a full-compliment radius and width of 0.088". Snap-ring 803 has an inner diameter of 1.621 and a wire gauge of 0.080"

Figure 7:
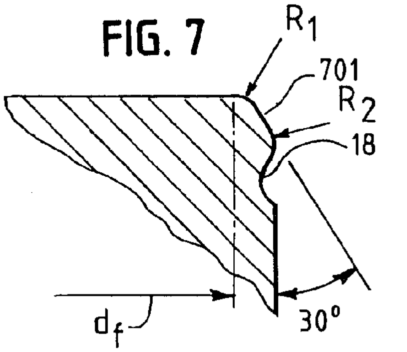
FIG. 7 is an enlarged fragmentary view of the encircled portion of the pressure pad of FIG. 6.

Referring to FIG. 7, it is also important that the groove 18 and taper 701 be formed correctly on the exterior surface of attachment shaft 15, pressure pad 25, and extension 50. In one of these examples, taper 701 is a lead-in taper of 30 degrees, formed to have a lead-in radius R1 of 0.047" beginning at diameter df of 1.514", and a lead-out radius R2 of 0.047".

Referring to FIG. 11-15, an exemplary process by which the dual-use adapters shown in Table 1 can be designed is now described for illustrative purpose. A dual-use adapter has a construction that allows it to operate in two operational modes. In the first operational mode, the adapter can serve as a "pusher" or "push adapter". In the second operational mode, the adapter can serve as a "receiver" or "receive adapter".

The process shown in FIGS. 11-15 uses a collection of data, related to the set of ball joints, with which the dual-use adapter are to operate, to generate one or more adapter designs. Each adapter design can function as both a push adapter and a receive adapter for a group of ball joints within the overall set. The process of FIGS. 11-15 is not meant to limit the scope of this application. A user could change the process by altering some of the parameters and design variables set forth herein without departing from the overall inventive concept. Further, a user could adapt the process to make single-mode adapters. For instance, one could use the portion of the process concerning pusher requirements, to design a single-mode push adapter. Further, the process is not limited to producing a particular number of adapters. The following examples describe the design of six dual-use adapters. However, one could utilize the process to design as few as one or more then six adapters. Lastly, the process, as described herein, utilizes ball joint data taken from known ball joint designs. Over time, as new ball joints will enter the market, one could adapt the process to include the new ball joint data.

The process in one example is performed on a computing device or system. The computing device in one example is a personal computer. In another example the computing device could be a workstation, a file server, a mainframe, a personal digital assistant ("PDA"), a mobile telephone, or a combination of these devices. In the case of more than one computing device, the multiple computing devices could be coupled together through a network.

A network in one example includes any network that allows multiple computing devices to communicate with one another (e.g., a Local Area Network ("LAN"), a Wide Area Network ("WAN"), a wireless LAN, a wireless WAN, the Internet, a wireless telephone network, etc.) In a further example, a network comprises a combination of the above mentioned networks. The computing device can be connected to the network through landline (e.g., T1, DSL, Cable, POTS) or wireless technology, such as that found on mobile telephones and PDA devices.

The computing device could include a plurality of components such as computer software and/or hardware components to carry out the process. A number of such components can be combined or divided. An exemplary component employs and/or comprises a series of computer instructions written in or implemented with any of a number of programming languages, as will be appreciated by those skilled in the art.

In one example, the process is embedded in an article including at least one computer-readable signal-bearing medium. One example of a computer-readable signal-bearing medium is a recordable data storage medium such as a magnetic, optical, and/or atomic scale data storage medium. In another example, a computer-readable signal-bearing medium is a modulated carrier signal transmitted over a network comprising or coupled with computing device or system, for instance, a telephone network, a local area network ("LAN"), the Internet, and/or a wireless network.

Figure 11:
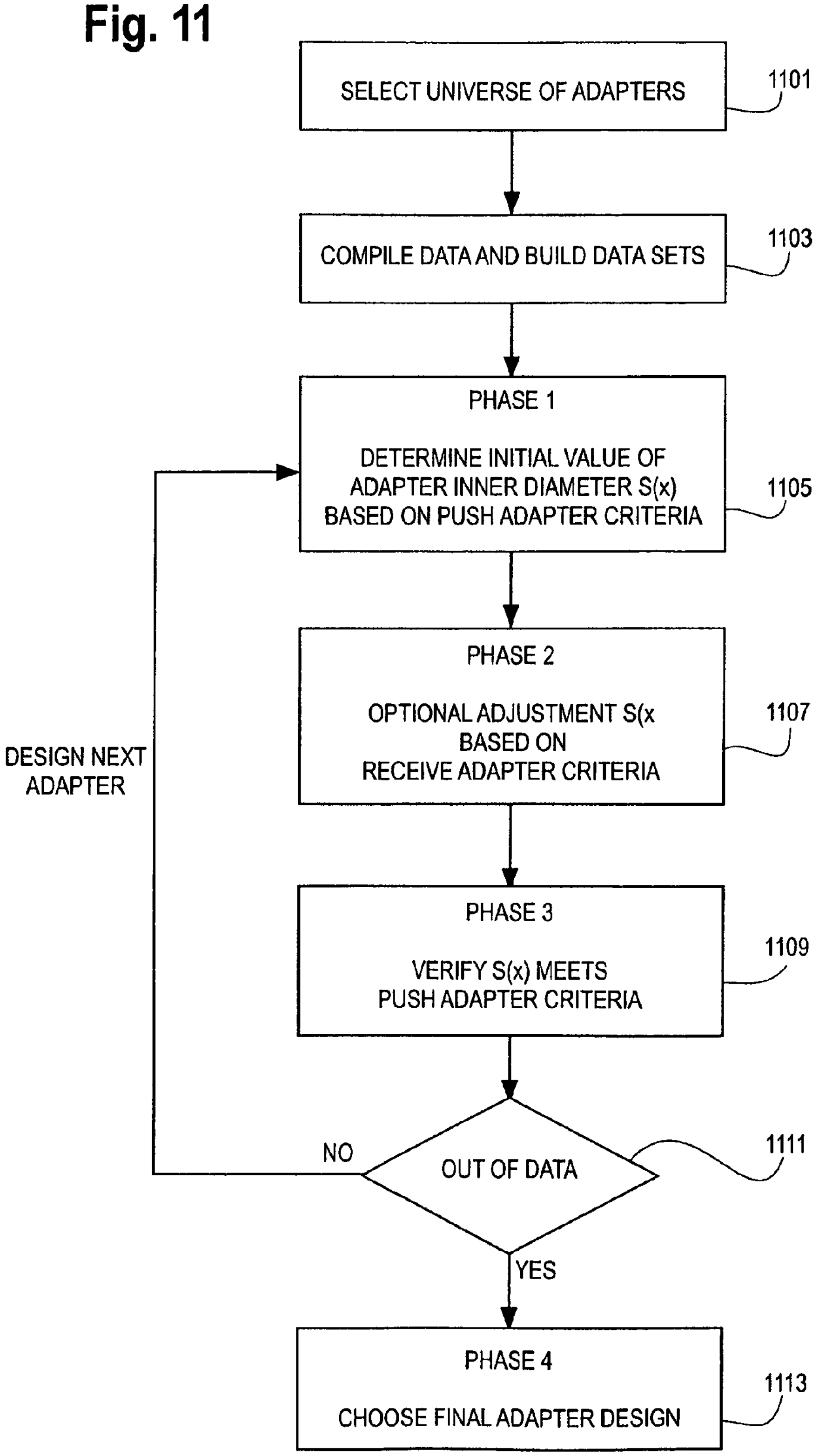
FIG. 11 is functional block diagram that shows a four-phase process for designing one or more adapters of a ball joint press.

Referring to FIG. 11, the process begins in step 1101. In step 1101, the designer of the ball joint press kit, selects the universe of ball joints with which the dual-use adapter(s), under design, should be compatible. The designer can perform step 1101 in a number of ways. For example, the designer could select ball joints that are compatible with a particular brand of vehicle, ball joints that are compatible with vehicles in a particular country, or ball joints for a particular time period. The designer can also compile this information in a number of ways, e.g., searching databases, reviewing catalogs, reviewing inventory lists, etc. The particular manner by which the designer selects the ball joints is not critical provided the search is sufficiently comprehensive to meet the designer's needs, i.e., covers the ball joints with which the designer wants the dual-use adapters to be compatible. Further, if necessary, the designer can select a sample of ball joints that represent the number of ball joints with which the adapters are to be compatible. Finally, the designer does not need to be the selector of the ball joints. A computer or database search program could perform the step of selecting the ball joints.

In step 1103, the data is compiled that relates to the ball joints and data sets are created. The process uses the data sets in designing the adapters. The data can be collected in a number of ways. For instance, a user can search databases, read product specifications, observe, or measure the ball joints. In one example, the process uses the data sets to determine one or more inner diameter values d1 (FIG. 8). Each inner diameter represents an adapter that will have that particular value. The adapter will function as a dual-use adapter for a group of ball joints within the universe of ball joints. The total number of dual-use adapters is dependent on the process. Put simply, if the process outputs six inner diameter values, the joint press kit will have six dual-use adapters, one for each inner diameter value. If the process outputs three inner diameter values, the joint press kit will have three dual-use adapters. The number of inner diameter values output from the process depends on the user's design criteria, the number of ball joints with which the adapters are to work, and certain design constants, used in the design algorithm, as will be described herein.

In one example, the process involves the creation of two data sets. An example of the first data set is shown in Table 4. Prior to preparing Table 4, 74 ball joints were selected as the universe of ball joints. It was then determined how many ball joints, of the 74, required the use of an adapter for a push operation. In the case of the 74 ball joints selected, 51 required the use of a push adapter during a push operation. For the remainder of the ball joints, a push operation can be performed with the pressure pad 22 or adapter attachment shaft 15 acting alone, i.e. without an adapter. Accordingly, Table 4 provides push adapter data for the 51 out of the 74 ball joints selected in step 1101. Push adapter data reflects characteristics an adapter must have in order to function as a push adapter with a particular ball joint. In Table 4, n is an index and represents a particular ball joint, MIN(n) is the smallest possible inner diameter, in inches, that an adapter can have and still function as a push adapter for a particular ball joint; MAX(n) is the largest possible inner diameter, in inches, that an adapter can have and still function as a push adapter for that ball joint. MID(n) is the midpoint, or the average, between MIN(n) and MAX(n). Table 4 also includes a ball joint identifier for each ball joint. The data in Table 4 is sorted in ascending order based on MID(n).

After compiling the data, the data is ready for use in the process. As will be described, each value of MID(n) is received by the process as input.

TABLE 4

| n | Ball joint ident. # | MIN(n) | MAX(n) | MID(n) |
|---|---|---|---|---|
| 1 | 28 | 1.550 | 1.775 | 1.663 |
| 2 | 30 | 1.550 | 1.775 | 1.663 |

TABLE 4-continued

| n | Ball joint ident. # | MIN(n) | MAX(n) | MID(n) |
|---|---|---|---|---|
| 3 | 32 | 1.590 | 1.685 | 1.638 |
| 4 | 76 | 1.595 | 1.720 | 1.658 |
| 5 | 45a | 1.617 | 1.685 | 1.651 |
| 6 | 45b | 1.617 | 1.690 | 1.654 |
| 7 | 6 | 1.645 | 1.730 | 1.688 |
| 8 | 16 | 1.645 | 1.730 | 1.688 |
| 9 | 15 | 1.646 | 1.750 | 1.698 |
| 10 | 29 | 1.647 | 1.750 | 1.699 |
| 11 | 20 | 1.650 | 1.750 | 1.700 |
| 12 | 21 | 1.655 | 1.750 | 1.703 |
| 13 | 36 | 1.657 | 1.750 | 1.704 |
| 14 | 73 | 1.690 | 1.835 | 1.763 |
| 15 | 74 | 1.695 | 1.835 | 1.765 |
| 16 | 56 | 1.715 | 1.915 | 1.815 |
| 17 | 65 | 1.730 | 1.840 | 1.785 |
| 18 | 10 | 1.740 | 1.850 | 1.795 |
| 19 | 43 | 1.740 | 1.850 | 1.795 |
| 20 | 50 | 1.740 | 1.850 | 1.795 |
| 21 | 1 | 1.750 | 1.850 | 1.800 |
| 22 | 3 | 1.750 | 1.830 | 1.790 |
| 23 | 14 | 1.750 | 1.850 | 1.800 |
| 24 | 55 | 1.835 | 2.070 | 1.953 |
| 25 | 58 | 1.900 | 2.020 | 1.960 |
| 26 | 5 | 1.915 | 2.040 | 1.978 |
| 27 | 7 | 1.950 | 2.060 | 2.005 |
| 28 | 11 | 1.950 | 2.060 | 2.005 |
| 29 | 12 | 1.950 | 2.030 | 1.990 |
| 30 | 53 | 1.950 | 2.050 | 2.000 |
| 31 | 72 | 1.950 | 2.100 | 2.025 |
| 32 | 9 | 1.960 | 2.050 | 2.005 |
| 33 | 25 | 1.960 | 2.050 | 2.005 |
| 34 | 37 | 1.960 | 2.020 | 1.990 |
| 35 | 2 | 1.970 | 2.030 | 2.000 |
| 36 | 4 | 1.970 | 2.030 | 2.000 |
| 37 | 13 | 1.990 | 2.180 | 2.085 |
| 38 | 35 | 2.000 | 2.180 | 2.090 |
| 39 | 39 | 2.000 | 2.080 | 2.040 |
| 40 | 60 | 2.057 | 2.275 | 2.166 |
| 41 | 61 | 2.088 | 2.275 | 2.182 |
| 42 | 8 | 2.135 | 2.310 | 2.223 |
| 43 | 41 | 2.160 | 2.365 | 2.263 |
| 44 | 22 | 2.190 | 2.375 | 2.283 |
| 45 | 59 | 2.240 | 2.375 | 2.308 |
| 46 | 42 | 2.240 | 2.370 | 2.305 |
| 47 | 69 | 2.300 | 2.440 | 2.370 |
| 48 | 66 | 2.375 | 2.490 | 2.433 |

TABLE 4-continued

| n | Ball joint ident. # | MIN(n) | MAX(n) | MID(n) |
|---|---|---|---|---|
| 49 | 68 | 2.380 | 2.460 | 2.420 |
| 50 | 44 | 2.390 | 2.460 | 2.425 |
| 51 | 23 | 2.400 | 2.500 | 2.450 |
| 52 | | | out of data | |

Referring to Table 5, a second data set is shown. The second data set lists receiver data. Table 5 provides a measure of the incidence of failure for a number of idealized or hypothetical adapters having various inner diameter values, while acting as receive adapters. Each hypothetical adapter is represented by z. The process uses the hypothetical adapter inner diameter values to determine and assess the receiver requirements of the adapters. RECDIA is an inner diameter value for a hypothetical adapter Z. RECFAIL is the number of functional failures that the hypothetical adapter would experience with the ball joints in the universe of ball joints selected in step 1101. Using the representative example, if there are 74 ball joints, then an adapter has 148 possible failure that it can experience with the universe of ball joints. This is because an adapter can be used in two possible operations, remove or an install. Accordingly, for a particular ball joint, an adapter can experience between 0-failures, i.e., no failure, failure in install operation only, failure in remove operation only, and failure in both operations. Thus, the number 148 equals 74×2, i.e. 74 ball joints times 2 possible operations (remove and install). A functional failure in one example means that the pertinent portion of the ball joint is of a larger diameter than the inner diameter, RECDIA, of the theoretical adapter and thus the adapter will not function as a receiver. For example, a RECDIA of 1.5 inches results in 148 failures. The failures are compiled for respective RECDIA values that are chosen to encompass all receiver adapter requirements. For example, Table 5 uses inner diameter, RECDIA, steps of 0.01 and includes 148 possible operations, with none requiring receiver diameters less than 1.5 or more than 3.0. All operations are successful with RECDIA values between 1.5 and 3.0. The data is sorted in ascending order by RECDIA value.

TABLE 5

| Z | RECDIA | RECFAIL | # | RECDIA | RECFAIL | # | RECDIA | RECFAIL |
|---|---|---|---|---|---|---|---|---|
| 1 | 1.500 | 148 | 54 | 2.020 | 58 | 107 | 2.540 | 10 |
| 2 | 1.510 | 146 | 55 | 2.030 | 58 | 108 | 2.550 | 10 |
| 3 | 1.520 | 146 | 56 | 2.040 | 56 | 109 | 2.560 | 10 |
| 4 | 1.530 | 146 | 57 | 2.050 | 56 | 110 | 2.570 | 10 |
| 5 | 1.540 | 146 | 58 | 2.060 | 56 | 111 | 2.580 | 10 |
| 6 | 1.550 | 146 | 59 | 2.070 | 56 | 112 | 2.590 | 10 |
| 7 | 1.560 | 146 | 60 | 2.080 | 56 | 113 | 2.600 | 8 |
| 8 | 1.570 | 146 | 61 | 2.090 | 55 | 114 | 2.610 | 8 |
| 9 | 1.580 | 145 | 62 | 2.100 | 54 | 115 | 2.620 | 7 |
| 10 | 1.590 | 142 | 63 | 2.110 | 54 | 116 | 2.630 | 7 |
| 11 | 1.600 | 142 | 64 | 2.120 | 54 | 117 | 2.640 | 7 |
| 12 | 1.610 | 142 | 65 | 2.130 | 54 | 118 | 2.650 | 3 |
| 13 | 1.620 | 139 | 66 | 2.140 | 54 | 119 | 2.660 | 2 |
| 14 | 1.630 | 133 | 67 | 2.150 | 52 | 120 | 2.670 | 1 |
| 15 | 1.640 | 133 | 68 | 2.160 | 51 | 121 | 2.680 | 0 |
| 16 | 1.650 | 133 | 69 | 2.170 | 51 | 122 | 2.690 | 0 |
| 17 | 1.660 | 133 | 70 | 2.180 | 51 | 123 | 2.700 | 0 |
| 18 | 1.670 | 133 | 71 | 2.190 | 50 | 124 | 2.710 | 0 |
| 19 | 1.680 | 132 | 72 | 2.200 | 47 | 125 | 2.720 | 0 |
| 20 | 1.690 | 132 | 73 | 2.210 | 38 | 126 | 2.730 | 0 |
| 21 | 1.700 | 132 | 74 | 2.220 | 36 | 127 | 2.740 | 0 |

TABLE 5-continued

| Z | RECDIA | RECFAIL | # | RECDIA | RECFAIL | # | RECDIA | RECFAIL |
|---|---|---|---|---|---|---|---|---|
| 22 | 1.710 | 132 | 75 | 2.230 | 33 | 128 | 2.750 | 0 |
| 23 | 1.720 | 132 | 76 | 2.240 | 33 | 129 | 2.760 | 0 |
| 24 | 1.730 | 132 | 77 | 2.250 | 32 | 130 | 2.770 | 0 |
| 25 | 1.740 | 124 | 78 | 2.260 | 32 | 131 | 2.780 | 0 |
| 26 | 1.750 | 119 | 79 | 2.270 | 32 | 132 | 2.790 | 0 |
| 27 | 1.760 | 118 | 80 | 2.280 | 32 | 133 | 2.800 | 0 |
| 28 | 1.770 | 115 | 81 | 2.290 | 32 | 134 | 2.810 | 0 |
| 29 | 1.775 | 111 | 82 | 2.300 | 31 | 135 | 2.820 | 0 |
| 30 | 1.780 | 111 | 83 | 2.310 | 25 | 136 | 2.830 | 0 |
| 31 | 1.790 | 111 | 84 | 2.320 | 25 | 137 | 2.840 | 0 |
| 32 | 1.800 | 108 | 85 | 2.330 | 24 | 138 | 2.850 | 0 |
| 33 | 1.810 | 107 | 86 | 2.340 | 19 | 139 | 2.860 | 0 |
| 34 | 1.820 | 106 | 87 | 2.350 | 19 | 140 | 2.870 | 0 |
| 35 | 1.830 | 105 | 88 | 2.360 | 19 | 141 | 2.880 | 0 |
| 36 | 1.840 | 105 | 89 | 2.370 | 19 | 142 | 2.890 | 0 |
| 37 | 1.850 | 104 | 90 | 2.380 | 18 | 143 | 2.900 | 0 |
| 38 | 1.860 | 103 | 91 | 2.390 | 18 | 144 | 2.910 | 0 |
| 39 | 1.870 | 103 | 92 | 2.400 | 17 | 145 | 2.920 | 0 |
| 40 | 1.880 | 103 | 93 | 2.410 | 16 | 146 | 2.930 | 0 |
| 41 | 1.890 | 97 | 94 | 2.420 | 15 | 147 | 2.940 | 0 |
| 42 | 1.900 | 91 | 95 | 2.425 | 14 | 148 | 2.950 | 0 |
| 43 | 1.910 | 90 | 96 | 2.430 | 14 | 149 | 2.960 | 0 |
| 44 | 1.920 | 89 | 97 | 2.440 | 14 | 150 | 2.970 | 0 |
| 45 | 1.930 | 88 | 98 | 2.450 | 14 | 151 | 2.980 | 0 |
| 46 | 1.940 | 84 | 99 | 2.460 | 14 | 152 | 2.990 | 0 |
| 47 | 1.950 | 82 | 100 | 2.470 | 14 | 153 | 3.000 | 0 |
| 48 | 1.960 | 82 | 101 | 2.480 | 14 | | | |
| 49 | 1.970 | 73 | 102 | 2.490 | 14 | | | |
| 50 | 1.980 | 69 | 103 | 2.500 | 14 | | | |
| 51 | 1.990 | 69 | 104 | 2.510 | 12 | | | |
| 52 | 2.000 | 69 | 105 | 2.520 | 12 | | | |
| 53 | 2.010 | 60 | 106 | 2.530 | 10 | | | |

Referring further to FIG. 11, in step 1105, Phase 1 of the optimization process takes place. Phase 1 involves performing an analysis on the data of Table 4 to find groups of ball joints with similar enough push adapter requirements, that a single adapter can function with each group as a push adapter. Phase 1 then calculates a value of the inner diameter that would allow the adapter to function as push adapter for the entire group. Phase 1 performs this process by using the data under MID(n) in Table 4 as input. In Phase 1, the inner diameter of the adapter design is given the name S(x), where x is an identifier of the group of ball joints with which a particular adapter functions as a dual-mode adapter. Accordingly, if adapters in Table 1 were designed by this process, x would equal 1-6. Accordingly, if x=1-6, then there will be 6 groups of ball joints. The adapter with inner diameter of S(1) would work as a dual-mode adapter with one group, the adapter with inner diameter of S(2) would work as a dual-mode adapter with another group, and so on.

In step 1107, Phase 2 performs analyzes and optionally adjusts the value of S(x) that Phase 1 calculates. Phase 2 utilizes the data in Table 5 to determine whether a slight increase in S(x) would appreciably reduce the number of failures that the adapter design would encounter as a receive adapter. If the answer is yes, then Phase 2 adjusts S(x) upward. If the answer is no, then S(x) is left as calculated by Phase 1.

In step 1109, Phase 3 performs a verification step to insure that an adapter with a value of S(x), as determined in Phases 1 and 2, will still work as a push adapter for the group of adapters that it should cover. This is necessary because if, for instance, Phase 2 increases the value of S(x), then the process must verify that S(x) has not been set to a value that would prevent it from functioning as a push adapter for the entire group x of ball joints.

In step 1111, a determination is made whether the process is out of input data from Table 4. If the answer is yes, then Phase 4 begins. FIG. 11 identifies Phase 4 as step 1113. In Phase 4, the process designs a final adapter that is capable of serving as a receive adapter for the entire universe of ball joints. If the answer is no in step 1111, then phases 1-3 are repeated.

A more detailed description of phases 1-4 will now be provided for illustrative purposes.

Figure 12:
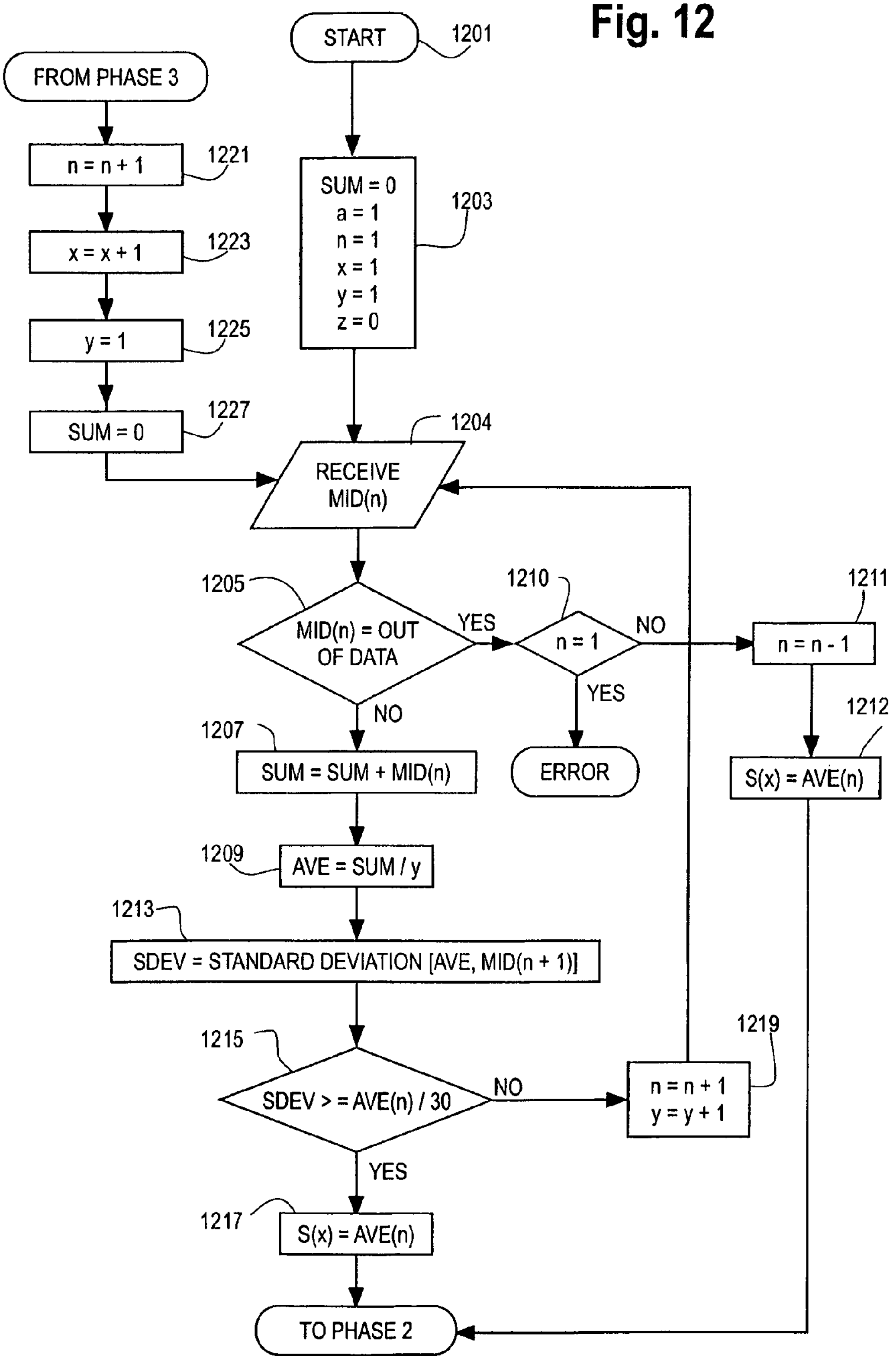
FIG. 12 is flow chart describing phase 1 of FIG. 11.

Referring to FIG. 12, Phase 1 starts at step 1201. At step 1203, the process initializes the variables used throughout the design process to initial values. A description of the variables is as follows:

n—represents a particular ball joint in the selected universe of ball joints.

x—represents a particular group of ball joints for which an adapter having an inner diameter value S(x) is designed.

y—used by Phase 1 to calculate a running average of MID(n).

SUM—used by Phase 1 to calculate a running average for MID(n).

z—represents a hypothetical adapter in Phase 2.

a—index variable used by Phase 3.

Referring further to FIG. 12, in step 1204, MID(n) is input. In step 1205, a determination is made as to whether MID(n) equals "out of data". If MID(n) does not equal "out of data", steps 1207 and 1209 compute a running average AVE(n) of MID(n). If MID(n) is "out of data", then in step 1210, the process determines whether n=1. If yes, an error condition exists and the designer must check the Table 4 data. If no, then in step 1211, n is decreased by 1, and in step 1212 S(x) is set to AVE(n) and flow passes to Phase 2. Decreasing n by one is necessary because AVE(n) would have an incorrect value if it took into account an "out of data" value.

One can see that steps 1204-1212 serve to incrementally calculate the average value of Mid(n) in Table 4 until the process reaches the end of the data set. When the process reaches the end of data, then in steps 1210-1212, the process insures that an error condition is not present, and if an error condition is not present, then S(x) is set, in steps 1211-1212 to the last valid computation of AVE. An error condition would be present if, for instance, MID(1) were equal to zero because this would mean either the data set were empty or missing data. If the end of data is reached, n is reduced by 1 in step 1211 because an empty value of Mid(n) should not be used in calculating S(x).

In step 1213, the standard deviation between AVE(n) and the next value of MID (i.e. MID(n+1)) in Table 4 is calculated. In step 1215, a determination is made as to whether the standard deviation is greater than AVE(n)/30. If the answer is yes, then in step 1217, a value of S(x) is set as equal to the current running average AVE(n) and flow passes to Phase 2. If the answer is no, then, in step 1219, n and y are incremented and another value of MID(n) is read into the process. Steps 1204-1217 continue until end of data or the relationship in step 1215 is true.

Whether a grouping allows the designation of a inner diameter value S(x) that would allow an adapter to work as a push adapter for the entire group is dependent on whether the relationship in step 1215 is true. Step 1215 calculates whether the standard deviation between the running average and the next value in Table 4, which has not been used in calculating the running average, exceeds the running average divided by 30. Put simply, step 1215 looks for a grouping in the push adapter data. Step 1215 determines whether the next ball joint push requirement diverges significantly from those that came before it. The relationship in step 1215 depends on the denominator used in step 1215. In FIG. 12, the value used is 30, although it could be any value that meets the designers criteria. The larger the value used, the more groups there will be and therefore more adapters there will be. The smaller the value the fewer the adapter will be, but the likelihood of design failure, as determined by phase 3 in step 1109, will increase. The inventors found that AVE(n)/30 provided an optimum number of adapters that will work as push adapters.

Table 6 shows the outputs of Phase 1, as they are calculated, if data for the exemplary group of ball joints provided in Table 2 is used as input. One can see that the MID(n) value is relatively stable until after n=13. Accordingly, the standard deviation, SDEV, remains relatively small. Therefore, the outlines of a grouping is not apparent. There is, however, a significant increase in MID between n=13 and n=14. This triggers a corresponding large increase in SDEV, thereby leading to the relationship of SDEV>AVE(n)/30 as true. Accordingly, the process determines that n=1-13 provides a ball joint grouping with which an adapter of with an inner diameter value of 1.677 could function as a push adapter. Accordingly, the process outputs 1.677 as the first value of S(x), i.e., S(1). Table 4 demonstrates that the data exhibits similar behavior between n=23 and n=24; n=39 and n=40; and n=46 and n=47. At n=52, Phase 1 realizes that it is out of data. Consequently, n is set back to 51 and the value of AVE(51), which is 2.420, is set as S(5).

TABLE 6

| | Ball | | Outputs | | | |
|---|---|---|---|---|---|---|
| n | joint ident. # | MID(n) | AVE(n) | SDEV(n) | AVE(n)/30 | s(x) output |
| 1 | 28 | 1.663 | | | | |
| 2 | 30 | 1.663 | 1.663 | 0.018 | 0.0551 | |
| 3 | 32 | 1.638 | 1.654 | 0.002 | 0.0552 | |
| 4 | 76 | 1.658 | 1.655 | 0.003 | 0.0551 | |
| 5 | 45a | 1.651 | 1.654 | 0.000 | 0.0551 | |
| 6 | 45b | 1.654 | 1.654 | 0.024 | 0.0553 | |
| 7 | 6 | 1.688 | 1.659 | 0.020 | 0.0554 | |
| 8 | 16 | 1.688 | 1.662 | 0.025 | 0.0555 | |
| 9 | 15 | 1.698 | 1.666 | 0.023 | 0.0557 | |
| 10 | 29 | 1.699 | 1.670 | 0.021 | 0.0557 | |
| 11 | 20 | 1.700 | 1.672 | 0.022 | 0.0558 | |
| 12 | 21 | 1.703 | 1.675 | 0.020 | 0.0559 | |
| 13 | 36 | 1.704 | 1.677 | 0.060 | 0.0588 | 1.677 |
| 14 | 73 | 1.763 | 1.763 | 0.002 | 0.0588 | |
| 15 | 74 | 1.765 | 1.764 | 0.036 | 0.0594 | |
| 16 | 56 | 1.815 | 1.781 | 0.003 | 0.0594 | |
| 17 | 65 | 1.785 | 1.782 | 0.009 | 0.0595 | |
| 18 | 10 | 1.795 | 1.785 | 0.007 | 0.0595 | |
| 19 | 43 | 1.795 | 1.786 | 0.006 | 0.0596 | |
| 20 | 50 | 1.795 | 1.788 | 0.009 | 0.0596 | |
| 21 | 1 | 1.800 | 1.789 | 0.001 | 0.0596 | |
| 22 | 3 | 1.790 | 1.789 | 0.008 | 0.0597 | |
| 23 | 14 | 1.800 | 1.790 | 0.115 | 0.0651 | 1.790 |
| 24 | 55 | 1.953 | 1.953 | 0.005 | 0.0652 | |
| 25 | 58 | 1.960 | 1.956 | 0.015 | 0.0654 | |
| 26 | 5 | 1.978 | 1.963 | 0.029 | 0.0658 | |
| 27 | 7 | 2.005 | 1.974 | 0.022 | 0.0660 | |
| 28 | 11 | 2.005 | 1.980 | 0.007 | 0.0661 | |
| 29 | 12 | 1.990 | 1.982 | 0.013 | 0.0661 | |
| 30 | 53 | 2.000 | 1.984 | 0.029 | 0.0663 | |
| 31 | 72 | 2.025 | 1.989 | 0.011 | 0.0664 | |
| 32 | 9 | 2.005 | 1.991 | 0.010 | 0.0664 | |
| 33 | 25 | 2.005 | 1.993 | 0.002 | 0.0664 | |
| 34 | 37 | 1.990 | 1.992 | 0.005 | 0.0664 | |
| 35 | 2 | 2.000 | 1.993 | 0.005 | 0.0664 | |
| 36 | 4 | 2.000 | 1.993 | 0.065 | 0.0667 | |
| 37 | 13 | 2.085 | 2.000 | 0.064 | 0.0669 | |
| 38 | 35 | 2.090 | 2.006 | 0.024 | 0.0669 | |
| 39 | 39 | 2.040 | 2.008 | 0.112 | 0.0722 | 2.008 |
| 40 | 60 | 2.166 | 2.166 | 0.011 | 0.0725 | |
| 41 | 61 | 2.182 | 2.174 | 0.034 | 0.0730 | |
| 42 | 8 | 2.223 | 2.190 | 0.051 | 0.0736 | |
| 43 | 41 | 2.263 | 2.208 | 0.053 | 0.0741 | |
| 44 | 22 | 2.283 | 2.223 | 0.060 | 0.0746 | |
| 45 | 59 | 2.308 | 2.237 | 0.048 | 0.0749 | |
| 46 | 42 | 2.305 | 2.247 | 0.087 | 0.0790 | 2.247 |
| 47 | 69 | 2.370 | 2.370 | 0.044 | 0.0800 | |
| 48 | 66 | 2.433 | 2.401 | 0.013 | 0.0803 | |
| 49 | 68 | 2.420 | 2.408 | 0.012 | 0.0804 | |
| 50 | 44 | 2.425 | 2.412 | 0.027 | 0.0807 | |
| 51 | 23 | 2.450 | 2.420 | | | 2.420 |
| 52 | | | | out of data | | |

Figure 13:
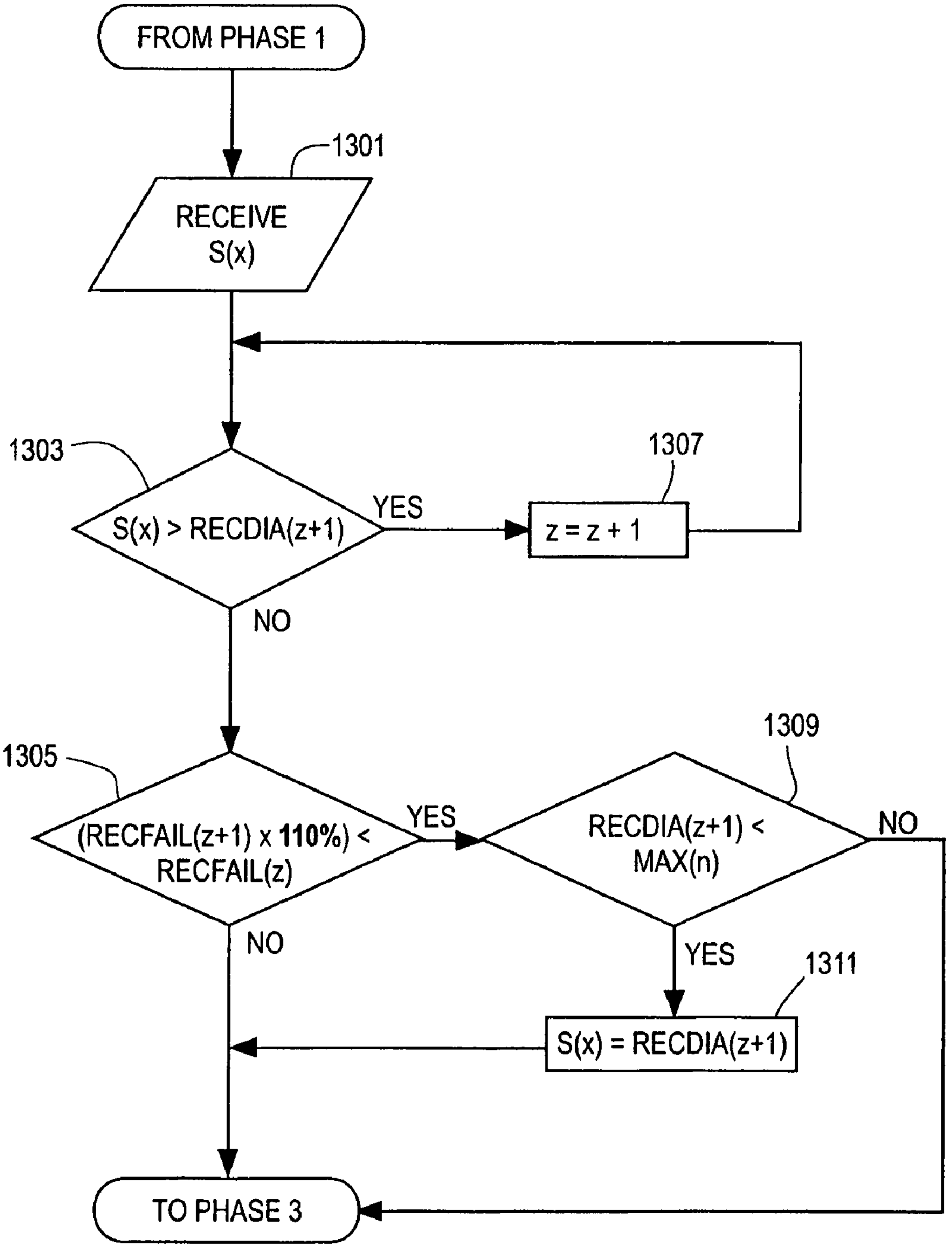
FIG. 13 is a flow chart describing phase 2 of FIG. 11.

Referring to FIG. 13, after each value of S(x) is generated, the process inputs the value to Phase 2, which uses the receiver data of Table 5, to determine whether an increase in the value of S(x) will result in fewer failures from a receiver perspective. Phase 2 begins at step 1301, in which the value of S(x) is input. At step 1303, a determination is made as to whether S(x)>RECDIA(z+1). If the answer is no, flow progresses to step 1305. If the answer is yes, z is incremented by 1 in step 1307 and step 1303 is repeated. Essentially, steps 1303 and 1307 scan the data in Table 5 until the process locates the hypothetical adapter value relevant to a determination of whether to make an adjustment. This can be illustrated by using S(1) from Table 6, which is 1.677 and examining Table 5. One can see that 1.677 is greater than RECDIA (1) through RECDIA(18). Accordingly, the process will simply continue past these values until it reaches RECDIA (19). At RECDIA(19), the process realizes in step 1303 that S(1) is less than 1.670, so Phase 2 progresses to step 1305.

In step 1305, the process evaluates whether RECFAIL(19) (i.e. the RECFAIL number for an inner diameter of 1.680) multiplied by 110% is less than the RECFAIL(18). If the answer is no, S(1) is left as 1.677 and flow passes to phase 3. If the answer is yes, in step 1309, the process determines whether 1.680, is less than the MAX(n) value from Table 4. In the present case, n was last 13 in Phase 1. Therefore, the process determines whether RECDIA(19), which is 1.670 is less than MAX(13), which equals 1.75. The answer is yes, so flow progresses to 1311, in which S(x) is increased to RECDIA(19), i.e. 1.680. If the answer were false, S(1) would remain 1.667. In either case, flow passes to Phase 3. It should be noted that for the data in Tables 4 and 5, the relationship in step 1305 was false so the process did not increase S(x) in Phase 2. Accordingly, the preceding example was used for illustrative purposes only.

Phase 2 is beneficial because it determines that if S(x) is between two data points in Table 5, for which the decrease in receiver failure is significant, then it is worthwhile to increase S(x). The inventors have determined that the relationship RECFAIL(z+1)×110%<RECFAIL(z) represents a significant decrease. The preceding relationship depends on the multiplier used, which in the present case is 110%. The applicants have found that other multiplier values can be used, but there are trade offs. The greater the threshold used, the less likely that the process will take advantage of an increase in adapter size to reduce receiver failure. On the other hand, if a lower multiplier is used, then a greater number of S(x) values will be adjusted, which could result in a higher frequency of design failure as determined in Phase 3.

Figure 14:
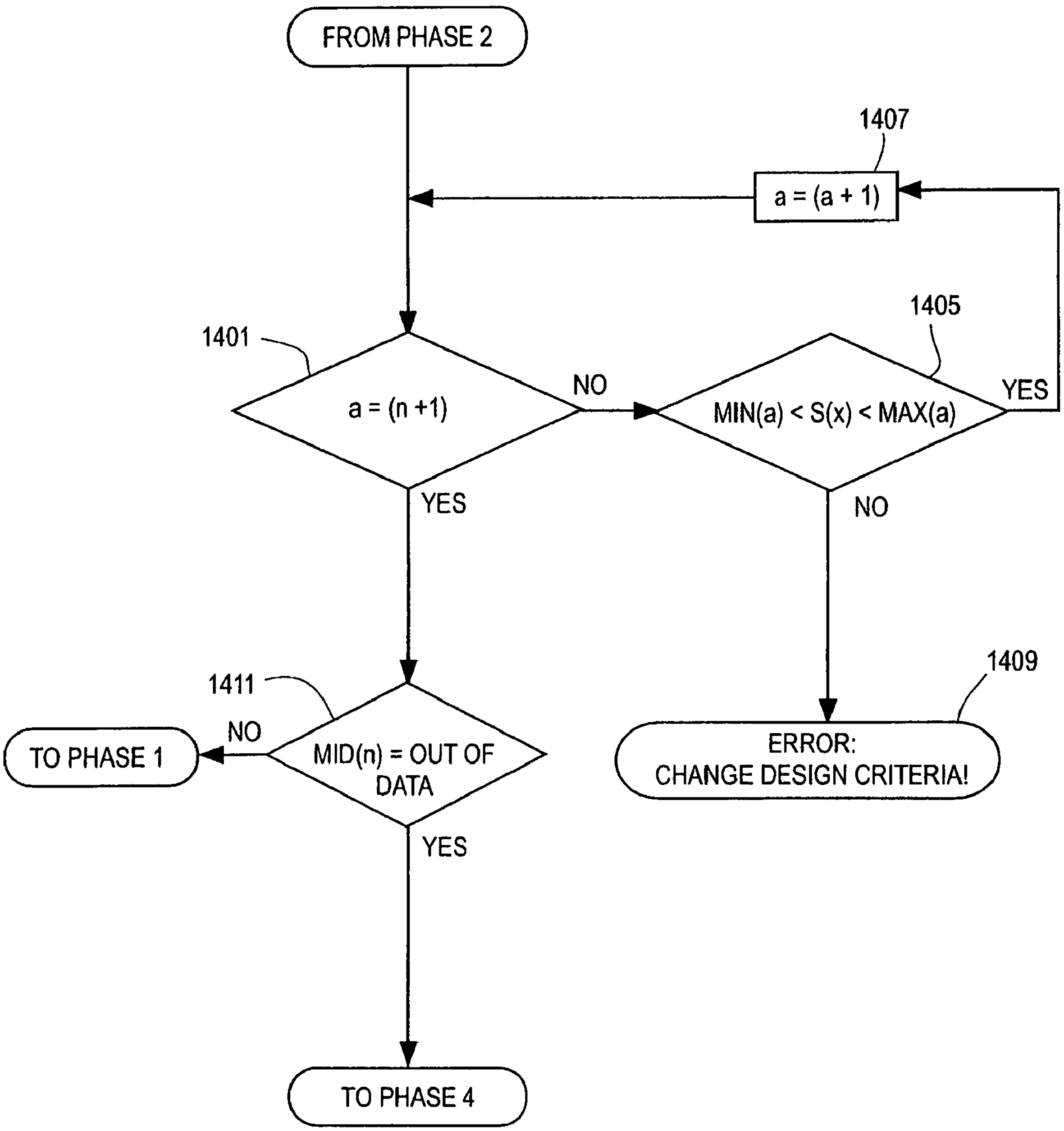
FIG. 14 is a flow chart describing phase 3 of FIG. 11.

Referring to FIG. 14, Phase 3 begins in step 1401. At step 1401, the process determines whether the index variable a is equal to n+1. Using the preceding S(1)=1.677, n would be 13, x would be 1 and a would be 1. Accordingly, step 1401 would determine whether a is equal to 14 (n+1). The answer is no, so a determination is made in step 1405 if S(1) is between the limits MIN(1) and MAX(1) as set forth in Table 4. If S(1) is between these limits, then an adapter with value S(x) 1.677 would function with the n=1 ball joint and flow would pass to step 1407 where a would be incremented. Step 1401 would then be repeated for MIN(2) and MAX(2). This process would be repeated until a=(n+1), which would equal 14. When a equals 14, the process would realize that it has verified S(1) for all of the ball joints in the group. If for some reason, S(1) did not comply with the MIN and MAX requirements, an error condition would be created in step 1409 and the designer would have to change the design criteria.

Once it is determined that S(x) either complies or does not comply with the MIN and MAX requirements for its ball joint grouping, flow passes to step 1411. In step 1411, a determination as to whether the next value from Table 4, (i.e. MID (n+1)) equals "out of data" is made. If this is the case, then Phase 4 begins. If this is not the case, Phases 1 through 3 repeat to find a new S(x) value. Referring to FIG. 12, if Phases 1 through 3 repeat, then in steps 1221-1223, the values of x and n are incremented. In step 1225, y is set to 1, and in step 1227, sum is set to zero. Phase 1 then begins anew.

Figure 15:
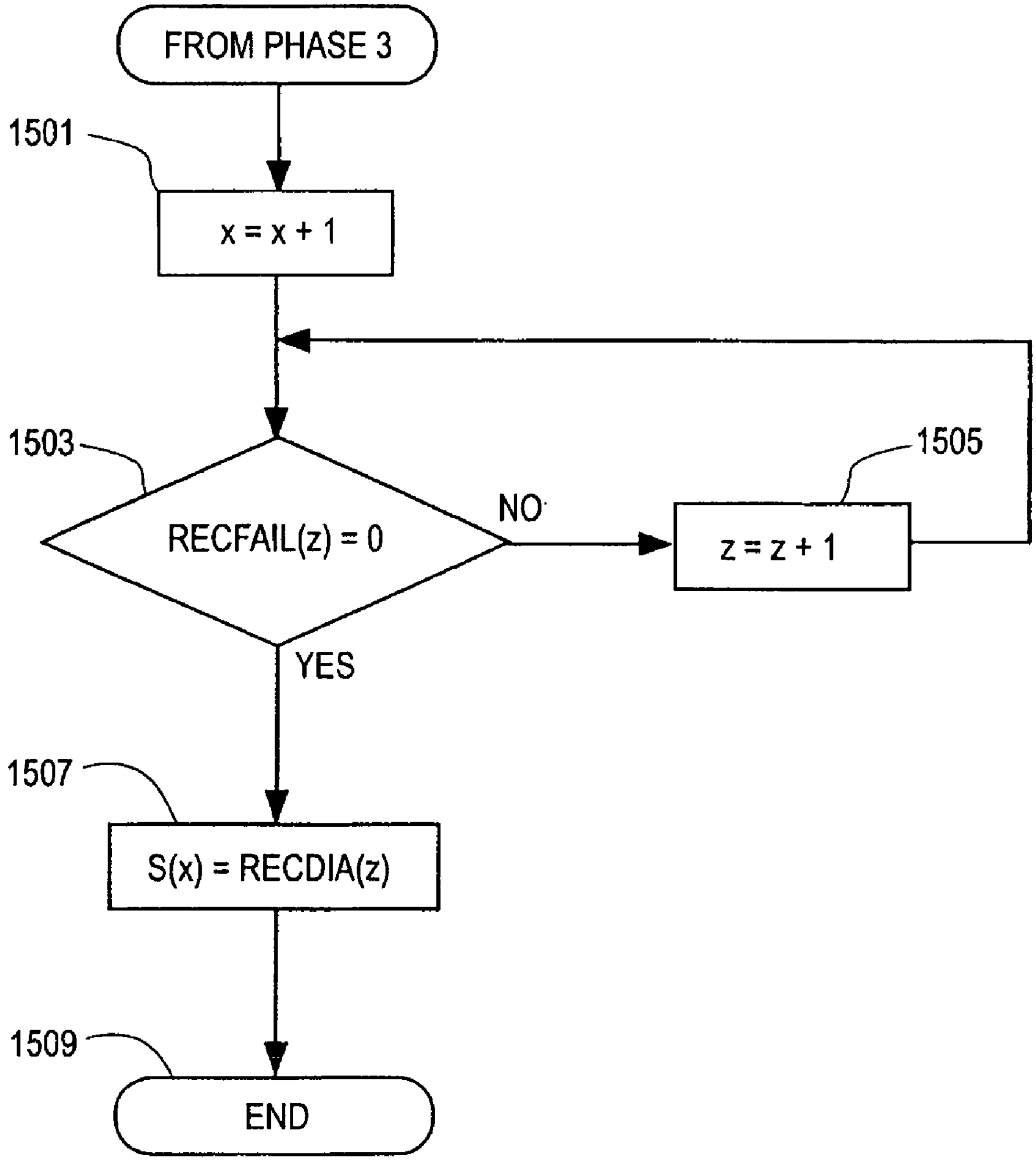
FIG. 15 is a flow chart depicting phase 4 of FIG. 11.

Referring to FIG. 15, Phase 4 involves determining a final S(x) value after the data in Table 4 has been exhausted. Phase 4 insures that one adapter can function as receiver for every ball joint. This is necessary because it is possible adapters having the S(x) values chosen in Phases 1-3 might not function as receivers for all of the ball joints in the universe of selected ball joints. Phase 4 creates one final S(x) value, i.e. one final adapter, by setting the value to the RECDIA for the first hypothetical adapter that will not have any failures. Such an adapter will not necessarily function as a push adapter with all of the ball joints but it will insure that 100% of the ball joints are covered for receiver operation by the dual-mode adapters.

Phase 4 works as follows: In step 1501, x is incremented. Thus, if Phases 1-3 produced five S(x) values, Phase 4 names the final S(x) value as S(6). In step 1503, the process determines whether RECFAIL(z) is zero. If it is not z is incremented in step 1505 and the step 1503 is repeated. When a RECFAIL value is determined to be zero, then in step 1507, the last S(x) value is set to the RECDIA value corresponding to that RECFAIL value, and the process ends in step 1509.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

The invention claimed is:

1. An article for designing at least one dual-mode adapter for use with a ball joint press that is compatible with a plurality of ball joints, the article comprising:

a non-transitory computer-readable signal-bearing storage medium including a plurality of modules stored thereon;

a module for defining an inner diameter (ID) of an adapter design;

a module for generating a first data set that includes a value of the first variable, for each of the plurality of ball joints, a minimum inner diameter (MIN) and a maximum inner diameter (MAX) of the adapter design that would allow the adapter design to work as a push adapter and, for each ball joint, a midpoint (MID) between MIN and MAX;

a module for defining a second variable representing a quantity of ball joints that are not compatible with the adapter design in a second operational mode;

a module for defining a plurality of hypothetical values of the first variable;

a module for generating a second data set including a value of the second variable for each hypothetical value of the first variable;

a module for sorting the first data set in ascending order by MID value, and wherein the module for sorting the first data set includes a module for selecting a number (1 . . . n) of ball joints, a module for computing an average value (AVE) of MID for the n ball joints, a module for calculating the standard deviation (SDEV) between AVE and the MID of the next ball joint (n+1) in the first data set, a module for dividing the MID of the last ball joint selected, by a numerical factor established by predetermined design criteria to obtain a quotient, and a module for setting a design value to AVE if SDEV is greater than or equal to the quotient;

a module for comparing the design value to the second data set to determine whether or not to change the design value to increase the number of ball joints that will function with the adapter design in the second operational mode; and a module for changing the design value in response to an affirmative determination that the design value should be changed to increase the number of ball joints that will function with the adapter design; and a module for outputting the design value for manufacturing the at least one dual-mode adapter.

2. The article of claim 1, wherein the module for defining the second variable includes a module for defining the second variable to represent a number of ball joints with which the adapter design will not function as a receiver.

3. The article of claim 2, wherein the module for generating the second data set comprises:

a module for defining the first variable as an inner diameters (ID) of the ball joint adapter design, a module for determining for each predetermined value of the first variable, the number of ball joints (RECFAIL) with which the adapter design will not function as a receiver, and a module for sorting the second data set, ascending order, by ID.

4. The article of claim 3, wherein the module for utilizing the second data set comprises:

a module for scanning the second data set, in ascending order until a predetermined value greater than the design value is located, a module for determining whether RECFAIL for the predetermined value greater than the design value is located, and a module for changing the design value to the predetermined value greater than the design value if RECFAIL for the predetermined value greater than the design value is less than RECFAIL for the predetermined value immediately previous in the second data set.

5. The article of claim 4, further comprising:

a module for verifying that adapter design will function in the first operational mode for the plurality of ball joints.

* * * * *